United States Patent [19]

Chelin et al.

[11] Patent Number: 4,554,590
[45] Date of Patent: Nov. 19, 1985

[54] DEVICE FOR POSITIONING VIDEO DISPLAY UNIT

[75] Inventors: Cesare Chelin, Caluso; Vittorio Ceradelli, Cascinette d'Ivrea, both of Italy

[73] Assignee: Ing. C. Olivetti & C., S.p.A., Ivrea, Italy

[21] Appl. No.: 588,513

[22] Filed: Mar. 12, 1984

Related U.S. Application Data

[63] Continuation of Ser. No. 268,143, May 28, 1981, abandoned.

[30] Foreign Application Priority Data

Jun. 5, 1980 [IT]  Italy .................................. 67868 A/80

[51] Int. Cl.⁴ .......................................... H04N 5/655
[52] U.S. Cl. ................................. 358/248; 248/181; 248/183; 358/254
[58] Field of Search ...................... 358/248, 249, 254; 248/159, 179, 181, 183, 349

[56] References Cited

U.S. PATENT DOCUMENTS

| | | | |
|---|---|---|---|
| 1,794,726 | 3/1931 | Mitchell | 248/181 |
| 2,922,609 | 1/1960 | Collier | 248/179 |
| 3,339,752 | 9/1967 | Trogan | 248/159 |
| 3,740,011 | 6/1973 | Dickson et al. | 248/183 |
| 3,970,792 | 7/1976 | Benham et al. | 358/254 |
| 3,974,994 | 8/1976 | Petterson | 248/181 |
| 4,415,136 | 11/1983 | Knoll | 248/181 |

FOREIGN PATENT DOCUMENTS

| | | | |
|---|---|---|---|
| 222804 | 10/1957 | Australia | 358/248 |
| 7909786 | 7/1979 | Fed. Rep. of Germany | |

Primary Examiner—Joseph A. Orsino, Jr.
Attorney, Agent, or Firm—Banner, Birch, McKie & Beckett

[57] ABSTRACT

The device for positioning a video display unit (VDU) comprises a supporting structure with a spherical cap provided at the bottom of the supporting structure, and a base with a frusto-conical seat for housing the spherical cap. The center of gravity of the VDU coincides substantially with the center of the spherical cap, and the base comprises a central pin projecting into a slot in the cap. This connection of pin and slot type enables the video unit to rotate in a vertical plane passing through the slot axis and in a horizontal plane perpendicular to the pin axis. One or more spacer rings complete with seat and pin can be stacked on the base to raise the VDU.

4 Claims, 6 Drawing Figures

DEVICE FOR POSITIONING VIDEO DISPLAY UNIT

This application is a continuation of Ser. No. 268,143, filed May 28, 1981, now abandoned.

BACKGROUND OF THE INVENTION

This invention relates to a device for positioning a video display unit (VDU). In office equipment such as data terminals and word processors, it is desirable to be able to adjust the tilt of a VDU about a horizontal, transverse axis, to suit the operator, and also to be able to adjust the orientation of the VDU about a vertical axis.

A device for positioning a VDU is known in which a supporting structure is pivoted in a fork which is rotatable in its turn about a horizontal axis of a base. This device allows wide variations in the positioning of the VDU. However, because of the fork and the other structures necessary for the horizontal rotation of the VDU, it is very costly.

A second device is also known in which the VDU rests by way of feet in two horizontal slots provided in the base. These two slots allow a limited positioning of the VDU in the horizontal plane. For its positioning in the vertical plane a third slot is provided in a projection adjacent to the front slot, such as to enable the VDU to be raised manually and be positioned with its front feet in this third slot so as to obtain a second position which is fixed with respect to the vertical plane. This device has the drawback of allowing very limited variations in the positioning of the VDU.

SUMMARY OF THE INVENTION

The object of the present invention is to provide a device for positioning a VDU which is simple, of small overall size and which allows wide variations in the positioning of the VDU with respect to its fixed support structure.

This object is attained by the device of the present invention, which comprises a supporting structure for the video display unit, and a coupling which connects it to the fixed structure and which comprises a seat, and a spherical surface arranged to cooperate with said seat to enable the supporting structure to rotate about the centre of curvature of the spherical surface.

BRIEF DESCRIPTION OF THE DRAWING

The invention will be described in more detail by way of example, with reference to the accompanying drawing, in which.

DESCRIPTION OF A PREFERRED EMBODIMENT

Figure 1:
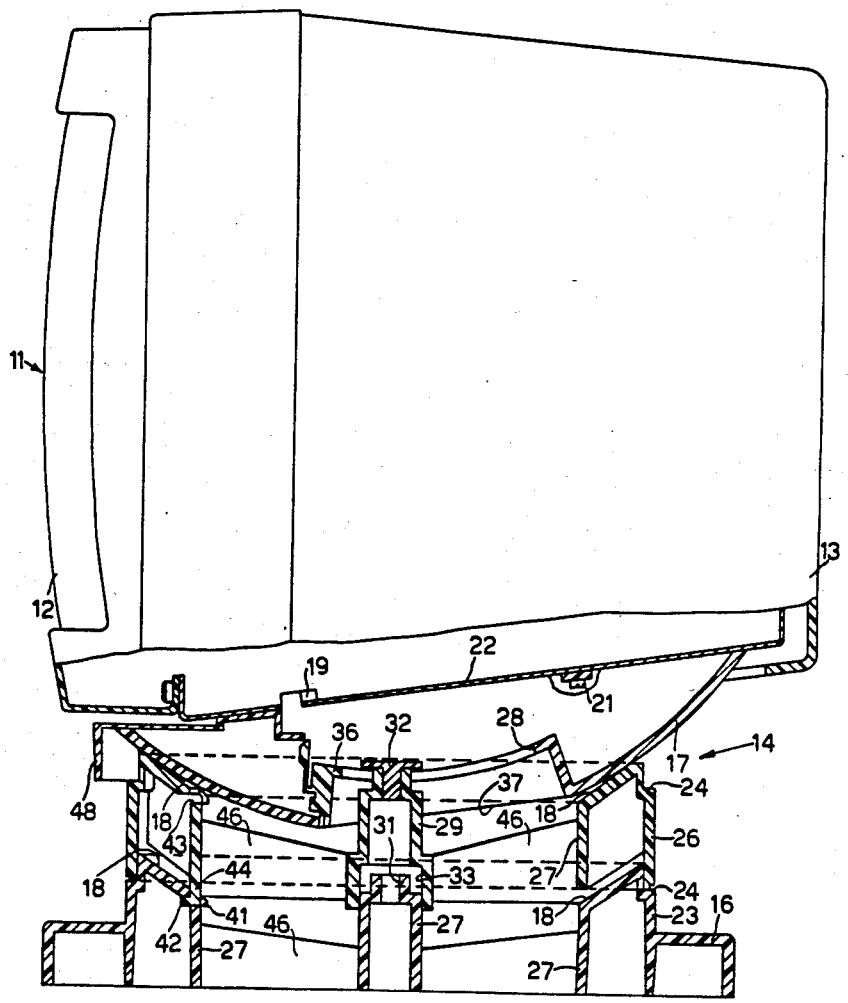
FIG. 1 is a partial side view of a VDU and a device according to the invention.

With reference to FIG. 1, a video operator station 11 comprises a video display unit (VDU) 12 mounted on a supporting structure 13, a positioning device 14, and a fixed structure or base 16. The positioning device 14 comprises a spherical surface element 17 arranged to cooperate with a frusto-conical support seat 18 of the base 16. The spherical surface element 17 comprises a spherical cap fixed by means of two lugs 19 (FIG. 2) and two screws 21 to a lower plate 22 (FIG. 1) of the supporting structure 13.

The base 16 is of substantially parallelepiped form, and comprises a cylindrical projection 23 in which the seat 18 is provided internally. The cylindrical projection 23 comprises an external shoulder 24 arranged to cooperate with a ring or spacer 26, which can be mounted between the base 16 and the supporting structure 13 in order to raise the VDU 12 from the base 16 as required by the user. The spacer 26 is also provided externally with the shoulder 24 and internally with the seat 18, and is perfectly equal to the cylindrical projection 23 of the base 16 in order to cooperate with the spherical cap 17. This enables several spacers to be superposed in order to further raise the video display unit 12.

Figure 4:
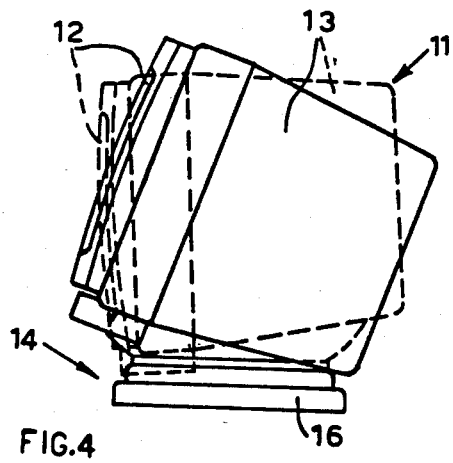
FIG. 4 is a diagrammatic view of the apparatus of FIG. 1 in a first working position.
Figure 5:
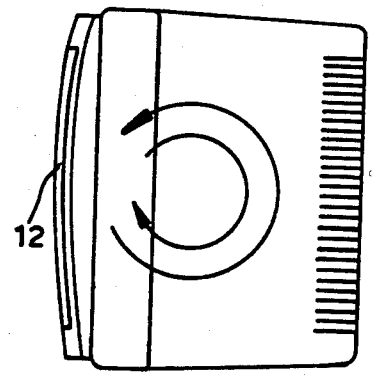
FIG. 5 is a diagrammatic view of the apparatus of FIG. 1 in a second working position.

The base 16 and spacer 26 comprise a central pin 27, 29 respectively, arranged to lie in a slot 28 in the spherical cap 17 in order to limit the vertical rotation of the video unit 12. The video unit 12 can rotate in a vertical plane passing through the axis of the slot 28 as shown in FIG. 4, and can rotate in a horizontal plane about the axis of the pin 27, 29 (FIG. 1) as shown by the arrows in FIG. 5.

The pin 27, 29 (FIG. 1) is constituted by an internally hollow cylinder comprising a seat 31 arranged to house a plug or cover 32. In addition the pins 29 of the spacers 26 comprise a coupling 33 arranged below to fit, with interference, over the top of the pins 27 or 29 to make the spacers 26 concentric with the base 16.

At one end, the slot 28 in the spherical cap 17 (FIG. 2) comprises a widened poriton 34 which allows passage of the cover 32. The widened portion 34 houses a stop element 36 to limit the stroke of the pin 27 during the positioning of the VDU. If the structure 13 is moved beyond its end-of-stroke, the cover 32 forces the element 36, and can pass through the widened portion 34 to enable the supporting structure 13 to be removed from the base 16. The lower part of the spherical cap 17 is cut in such a manner as to form a horizontal support plane 37 (FIG. 1) for the supporting structure 13 during the dismantling of the video station 11. In addition, the spherical cap 17 comprises a set of ribs 38 (FIG. 2) for strengthening the cap.

Figure 3:
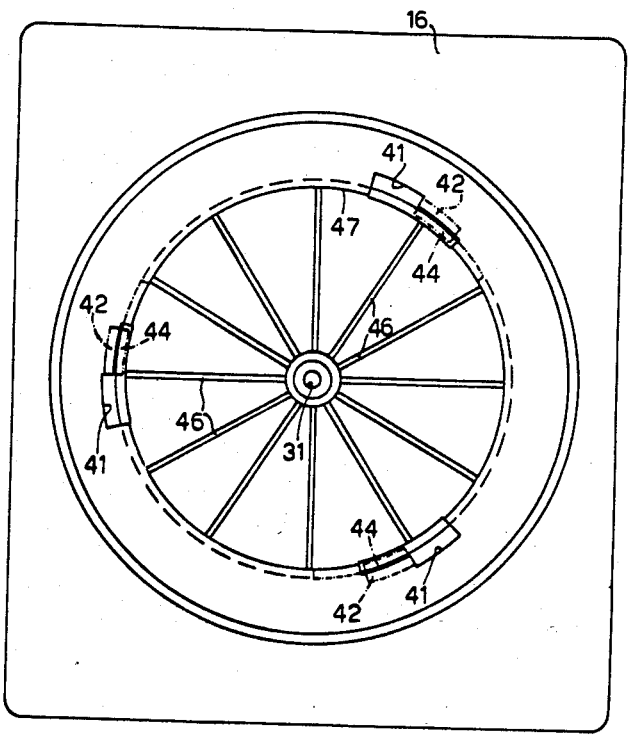
FIG. 3 is a partial plan view of further details of FIG. 1.

The spacers 26 (FIG. 1) can be locked to the base 16 by a bayonet coupling. For this purpose, the base 16 comprises three L slots 41 (FIG. 3) disposed at 120° apart, and arranged to allow passage of three legs 44, comprising teeth 42, disposed on the spacer 26 at 120° apart, and represented by a dashed and dotted line in FIG. 3. Locking is attained by firstly inserting the teeth 42 into the wide part of the slot 41 and then rotating the spacer 26 until the tooth 42 reaches the end of its path of movement in the slot 41. In this manner, the base 16 is made rigid with the spacer 26 (FIG. 1). Likewise, each spacer 26 comprises three L slots 43 equal to the slots 41 in the base 16, to allow passage and engagement of the three teeth 42 if two or more spacers are superposed.

Both the case 16 and spacers 26 are generally of plastics construction, and comprise a set of radial ribs 46 (FIG. 3) which connect the pin 27 or 29, as one piece therewith, to an internal cylindrical wall 47 coaxial with the support element 18.

The video station 11 (FIG. 1) comprises a front plate 48 fixed to the plate 22, and a set of knobs or keys, not shown on the drawings, which can be arranged either on the front plate 48 or on the walls around the VDU 12.

The curvature of the spherical cap 17 and its position with respect to the apparatus 11 are so calculated with the centre of gravity of the apparatus coincides with the centre of curvature of the cap. In addition, the materials used and the finish chosen for the surfaces of contact between the cap and support element are such as to ensure a fairly high coefficient of friction. In this manner, whereas the force necessary for varying the positioning of the video unit is low, any undesirable positioning changes due to vibration or impact are prevented.

Figure 2:
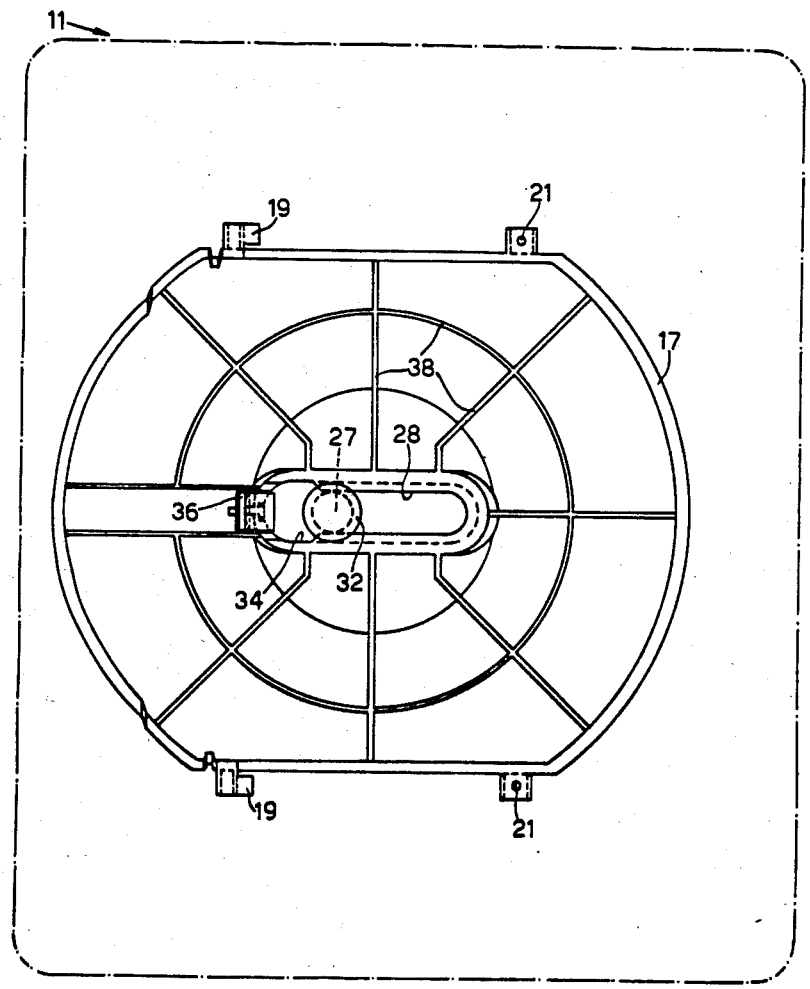
FIG. 2 is a partial plan view of some details of FIG. 1.
Figure 6:
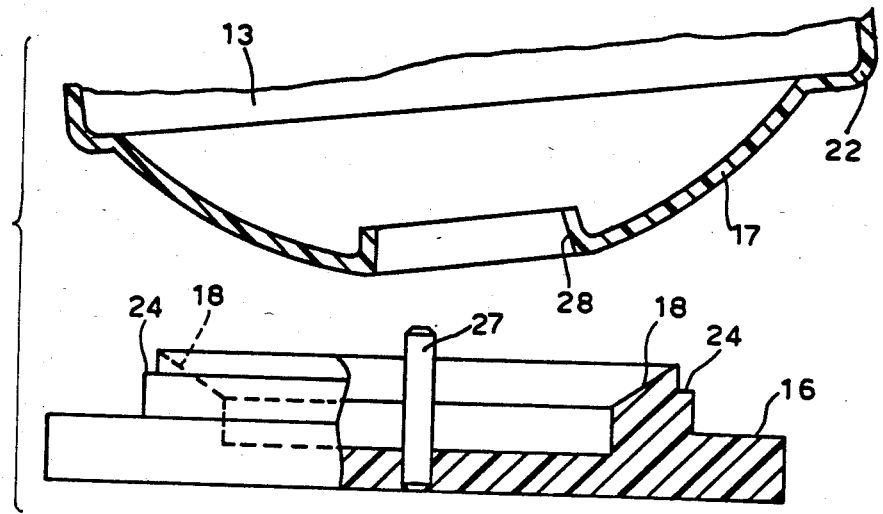
FIG. 6 is an exploded partial side view of a modification of FIG. 1.

Various modifications can be made to the device 14 for positioning a VDU. In particular, the spherical surface element 17 can be formed in one piece with the lower wall 22 as shown in FIG. 6. In addition, the pin 27 can be a simple solid cylindrical pin, even of a different material than that of the base 16, and guided by the slot 28. Finally, the support seat 18 can be spherical, and the spherical cap 17 can be completely circular and not as shown in FIG. 2. The connection between the pin 27 and the slot 28 can be dispensed with, and in this latter case the cap 17 can be inclined transversely to the horizontal plane of the video unit. This facility for transverse inclination can be attained by means of a second spherical cap connected by a pin and slot to the supporting structure of the video unit, and connected in its turn by a pin and slot to the base in such a manner that the two slots lie in planes which are mutually perpendicular. Finally, the relative positions between the pin and slot and between the cap and support element can be reversed with respect to that described. In other words, the slot and/or cap can be provided in the base, and the pin can be fixed on to the supporting structure of the video display unit.

What we claim is:

1. A device for positioning a video display unit with respect to a fixed structure wherein the video display unit is mounted on a video structure having a lower portion, said device comprising a base having a vertical projection which projects upward and includes internally a seat, a spherical surface element projecting downward from the lower portion of said video structure arranged to cooperate with said seat, a pin and slot connection between the spherical surface element and the seat for enabling the video display unit to incline with respect to said base in a vertical plane passing through the axis of the slot and to freely rotate in a horizontal plane perpendicular to the axis of the pin, wherein the section of said spherical surface element is dimensionally slightly smaller than the section of said video structure, and wherein the curvature of the spherical surface element is such that the center of gravity of the video display unit substantially coincides with the center of curvature of the spherical surface element, and mounting means for holding together the video display unit with the base and for enabling the dismantling of the video display unit from the base and the handling of the video display unit away from said base, said mounting means comprising the pin of said pin and slot connection fixed to said base, means defining a circular edge on the lower portion of the spherical surface element for supporting the video structure when the video structure is dismantled from the base, wherein said means defining a circular edge include a recessed surface which extends internally to said spherical surface and contains the slot of said pin and slot connection, and wherein said slot is recessed with respect to said circular edge, and an enlarged element at one end of said pin to avoid disengagement of the pin from the slot, means defining a widened portion at one end of the slot which allows passage of said enlarged element, and a releasable stop element for limiting the stroke of the pin along the slot preventing registration of said enlarged element with the widened portion of said slot, wherein said stop element is flexibly supported by said spherical surface element and it is forceable by said pin to cause said enlarged element to pass through said widened portion.

2. A device for positioning a video display unit with respect to a fixed structure wherein the fixed structure comprises a base including a cylindrical projection having an internal frusto-contical support seat coaxial with the projection and a pin which projects upwardly internally and coaxially with the internal frusto-conical support seat, wherein the video display unit comprises a supporting structure which comprises a spherical surface element arranged to cooperate with said frusto-conical support seat, wherein the spherical surface element comprises a slot housing the pin for enabling the video display unit to incline in a vertical plane passing through the axis of the slot and wherein a lower part of said spherical surface element comprises a recessed surface containing said slot, and said cylindrical projection and said slot enable the video display unit to freely rotate through 360° in a horizontal plane about the axis of the pin irrespectively of the inclination of the video display unit in said vertical plane, wherein the center of gravity of the video display unit coincides substantially with the center of curvature of the spherical surface element, and wherein the spherical surface element and the frusto-conical support seat are of plastic material and the finish chosen for the surfaces of contact between the spherical surface element and the frusto-conical support seat are such as to ensure a fairly high coefficient of friction in order to provide that the force necessary for varying the positioning of the video display unit is low and to prevent undesirable positioning changes due to vibration or impact.

3. A device for positioning a video display unit with respect to a fixed structure wherein the fixed structure comprises a base including a cylindrical projection having an internal frusto-conical support seat coaxial with the projection and a pin which projects upwardly internally and coaxially with the internal frusto-conical support seat, wherein the video display unit comprises a supporting structure which comprises a spherical surface element arranged to cooperate with said frusto-conical support seat, wherein the spherical surface element comprises a slot housing the pin for enabling the video display unit to incline in a vertical plane passing through the axis of the slot and wherein said spherical surface element comprises a recessed surface comprising said slot, and said cylindrical projection and said slot enable the video display unit to freely rotate through 360° in a horizontal plane about the axis of the pin irrespectively of the inclination of the video display unit in said vertical plane, wherein the center of gravity of the video display unit coincides substantially with the center of curvature of the spherical element, and wherein the spherical surface element and the frusto-conical support seat are of plastic material and the finish chosen for the surfaces of contact between the spherical surface element and the frusto-conical support seat are such as to ensure a fairly high coefficient of friction in order to provide that the force necessary for varying the positioning of the video display unit is low and to prevent undesirable positioning changes due to vibration or impact, wherein said lower part of the spherical surface element is shaped in such a manner as to form a horizontal support plane for supporting the spherical surface element during the dismantling of the video display unit from said base.

4. A device for positioning a video display unit with respect to a fixed structure wherein the video display unit is mounted on a supporting structure having a lower portion, said device comprising a base having a vertical projection which projects upward and includes internally a seat, a spherical surface element projecting downward from the lower portion of said supporting structure arranged to cooperate with said seat, and a connection of the pin and slot type between the spherical surface element and the seat for enabling the video display unit to rotate with respect to said base in a vertical plane passing through the axis of the slot and in a horizontal plane perpendicular to the axis of the pin, wherein the section of said spherical surface element is dimensionally similar to the section of said supporting structure, wherein the curvature of the spherical surface element is such that the center of gravity of the video display unit substantially coincides with the center of curvature of the spherical surface element, and wherein the pin projects from said base and the slot is formed in said spherical surface element, further comprising a spacer insertable between the video display unit and the base, and comprising a lower part engageable with the vertical projection of the base and an upper part provided with another seat for said spherical surface element and with another pin engageable with the slot of said surface element and wherein a lower part of said other pin comprises a position engageable with the pin projecting from said base.

* * * * *